Dec. 19, 1950     W. K. ERGEN     2,534,505
CAPACITY PICKUP FOLLOW-UP SYSTEM
Filed Dec. 15, 1944
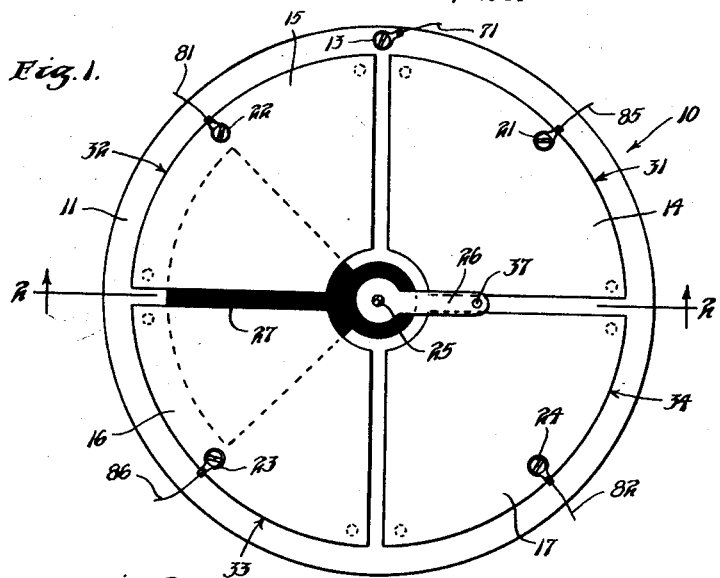
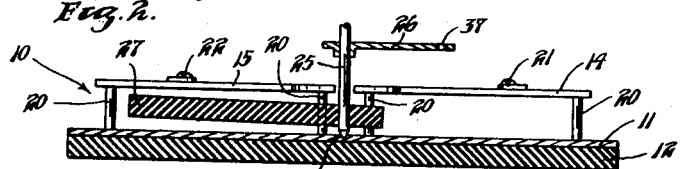
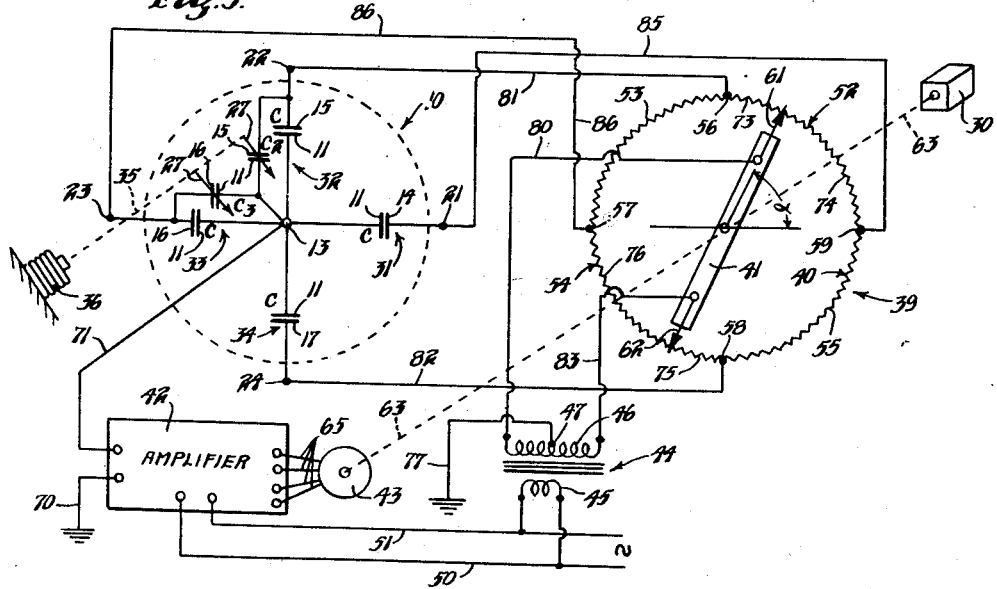
INVENTOR
WILLIAM K. ERGEN
BY George H. Fisher
ATTORNEY Patented Dec. 19, 1950

2,534,505

UNITED STATES PATENT OFFICE 2,534,505

CAPACITY PICKUP FOLLOW-UP SYSTEM

William K. Ergen, Minneapolis, Minn., assignor to Minneapolis-Honeywell Regulator Company, Minneapolis, Minn., a corporation of Delaware Application December 15, 1944, Serial No. 568,333

5 Claims. (Cl. 318—25)

This invention relates to the field of electrical engineering, and more specifically to the field of motor control systems and that of telemetric systems for making available at a remote point an indication of change in a condition, or for performing at a first point a control function initiated at a second relatively remote point. It is an object of my invention to provide a new and improved motor control system for use with reversible electric motors.

It is an object of my invention to provide a new and improved self-balancing electrical network.

It is an object of my invention to provide a new and improved capacity pick-up especially constructed to minimize the effect of manufacturing imperfections on the accuracy of the complete device.

It is another object of my invention to provide a new and improved telemetric system embodying my improved pick-up.

It is yet another object of my invention to provide a new and improved condition control system in which a motor is controlled, according to my improved motor control system, by variation in my improved capacity pick-up.

It is a further object of my invention to provide a new and improved capacity pick-up employing a dielectric vane rotatable between plates of electrically conductive material, so that the electric field between the plates is not appreciably distorted by inaccurate mounting of the movable vane, or by movement of the vane toward or away from the plates.

Various other objects, advantages, and features of novelty which characterize my invention are pointed out with particularity in the claims annexed hereto and forming a part hereof. However, for a better understanding of the invention, its advantages and obects attained by its use, reference should be had to the subjoined drawing, which forms a further part hereof, and to the accompanying descriptive matter, in which I have illustrated and described a preferred embodiment of my invention.

In the drawing:

Figure 1 is a plan view, partly in section, of my improved capacity pick-up;

Figure 2 is a sectional elevation of my pick-up, taken along the line 2—2 of Figure 1, and Figure 3 is a schematic diagram showing the general association of the parts making up my improved motor control and telemetric system, and embodying my improved capacity pick-up.

Referring first to Figures 1 and 2, it will be seen that my improved capacity pick-up is identified by the reference numeral 10, and comprises a first circular metallic plate 11 suitably insulated from ground and other electrical conductors by a nonconducting member 12, which may be of any desired nature. Plate 11 is to comprise one electrode of each of a plurality of capacitors, and to that end the plate is provided with a terminal 13 for making electrical connection therewith.

Supported in equally spaced parallel relationship from plate 11 are a plurality of plates 14, 15, 16, and 17 of equal area and similar outline. I have shown the plates as supported on insulating pillars 20, but any equivalent supporting means such as may occur to those skilled in the mechanical arts may be used. Upper plates 14, 15, 16, and 17 are designed to cooperate with plate 11 to comprise a group of capacitors of equal normal capacitance, there being an air dielectric between the plates, and the plates are respectively provided with terminals 21, 22, 23, and 24.

Plate 11 provides at its center a foot bearing 29 for a shaft 25 carrying an actuating arm 26. The shaft may in practice be provided with an outboard bearing and such other conventional refinements of mechanical structure as may be desired: these are not illustrated in the schematic showing of Figure 2.

Fixed to shaft 25 for integral rotation therewith is a vane 27 of a solid dielectric material of uniform thickness and of an outline similar to that of the upper plates. It will be seen that to the extent to which vane 27 intervenes between plate 11 and one of the upper plates 14, 15, 16, or 17, the average dielectric constant of the material between the plates of that particular capacitor is altered. Each of the four capacitors may therefore be considered as a variable capacitor whenever vane 27 moves within its electrostatic field, and as a fixed capacitor at all other times. This is shown schematically in Figure 3, which illustrates an arrangement of capacitors equivalent to that shown in Figure 1, where vane 24 is shown as extending equally under plates 15 and 16. Plate 11 and plate 14 combine to form a first fixed capacitor 31 and plate 11 and plate 17 combine to form a second fixed capacitor 34, while plate 11 and plate 15 and plate 11 and plate 16, respectively, combine to form variable capacitors 32 and 33, the variation being brought about by the adjustable presence of vane 27 between the respective plates.

If vane 27 were in a position displaced in a clockwise direction through 90° from that shown, the capacitor comprising plates 11 and 16 would be a fixed capacitor and that comprising plates 11 and 14 would be a variable capacitor.

Arm 26 has been shown as being provided with an aperture 37 for connection to a suitable operating link. This link is identified by the reference numeral 36 in Figure 3, and is shown as being operated by a pressure responsive bellows 36. It will be appreciated, however, that this arm may be arranged for operation by any desired condition responsive member, and that if it is desired to cause rotation of shaft 25 through a considerable angle, for example one or more complete revolutions, a gear and pinion or other suitable drive between shaft 25 and the condition responsive member can be substituted for arm 26 and link 35.

Referring again to Figure 3 of the drawing, it will be seen that my complete circuit includes a voltage distributor, 39 comprising endless resistance member 40 cooperating with a contact arm 41, an amplifier 42, a split phase motor 43, and a transformer 44 having a primary winding 45 and a secondary winding 46, the latter being provided with a center tap 47. Electrical energy is provided to amplifier 42 and primary winding 45 of transformer 44 by conductors 50 and 51 from any suitable source of alternating current.

Endless resistance member 40 is shown to comprise a plurality of resistors 52, 53, 54, and 55 connected in a closed series circuit, so that there is a common terminal 56 between resistors 52 and 53, a common terminal 57 between resistors 53 and 54, a common terminal 58 between resistors 54 and 55, and a common terminal 59 between resistors 55 and 52. The resistances of resistors 52, 53, 54, and 55 are equal and uniformly distributed.

Resistance member 40 is arranged in the shape of a ring, and contact arm 41 is arranged for rotation about the center of this ring. Arm 41 carries at its extremities a pair of sliders 61 and 62 in contacting engagement with the resistance member 40, and is mounted on a shaft 63 actuated by motor 43 for rotation therewith: it should be understood that motor 43 includes a suitable high ratio gear reducer to adapt it for use in this location. Shaft 63 is also connected to actuate a control device 30 which may be an indicator, a heat flow control member such as a damper, or any other desired apparatus.

Motor 43 is shown as energized from amplifier 42 through conductors 65 so that it reverses in direction with reversal in phase of the signal applied to the input of the amplifier. This general method of motor control is disclosed in Anschutz-Kaempfe Patent 1,586,233, but it must be clearly understood that my invention will operate with perfect satisfaction with any other type of amplifier in which the output of the amplifier is dependent in phase upon the phase of the input voltage.

*Operation*

The operation of my invention as disclosed in Figure 3 will now be explained. Electrical energy is conducted to sliding contacts 61 and 62 from secondary winding 46 of transformer 44 by conductors 80 and 83, respectively. Plate 11 is grounded as at 70 through conductor 71 and the conventional input resistor (not shown) of amplifier 42. Center tap 47 is grounded as at 77.

The impedances of capacitors 31, 32, 33, and 34 are ordinarily high compared with the resistances of members 52, 53, 54, and 55. Therefore, the currents required to produce significant IZ drops across the capacitors are very small compared to the currents flowing around the circular resistor, and may be disregarded. The following outline of operation is based on the assumption that the pick-up currents can be neglected.

As previously pointed out, vane 27 and plates 14, 15, 16, and 17 are similar in shape and equal in area, and in practice the spaces between the radially adjacent edges of the plates are extremely small. With air only as the common dielectric of the capacitors; that is, in the absence of vane 27, the capacitors are of equal capacitance: let the magnitude of this capacitance be represented by C. The intromission of a portion of vane 27 between the plates comprising any capacitor can only increase this capacitance, since the dielectric constant of the material of which the vane is made is many times that of air. C is therefore the minimum capacitance of each of the capacitors.

It is proper to represent each capacitor as a fixed capacitor of the minimum capacitance C connected in parallel with a variable capacitor $C_x$ of capacitance varying from zero to a maximum value $C_m$. The magnitude of $C_m$ is the difference between the minimum capacitance and the capacitance when the vane is completely interposed between the plates of a given capacitor X. From the geometry of the device, the variable capacitors are of equal maximum capacitance, and the capacitance change is linear with angular displacement of the vane up to 90° in either direction from the position of maximum capacitance for a given capacitor. The remaining 180° movement of the vane has no effect on the capacitance of the capacitor in question. The variable capacitance of capacitors 31, 32, 33, and 34 are identified below by the numerals $C_1$, $C_2$, $C_3$, and $C_4$.

In the position of the vane disclosed in Figure 1, capacitors 31 and 34 have the minimum value: that is, $C_1$ and $C_4$ have the value zero. The vane is shown in a midposition between plates 15 and 16: the capacitances of capacitor $C_2$ and $C_3$ are therefore equal and have half of their maximum magnitude.

Let the voltage output of winding 46 be of magnitude 2E: this is the potential difference between sliders 61 and 62. Current flows from slider 61 in a pair of paths, the first including portion 73 of resistor 52, resistor 53, and portion 76 of resistor 54, and the second including portion 74 of resistor 52, resistor 55, and portion 75 of resistor 54. Since the resistances of these two paths are equal, the currents are also equal: let the magnitude of each of these currents have the value I.

In Figure 3, the angle α may be defined as the counterclockwise displacement of slider 61 from terminal 59. Let the resistance of each of the resistors have a value R, and let K represent the resistance of portion 74 of resistor 52 (and of portion 76 of resistor 54). Then $$K:R::\alpha:90$$

or $$K=\alpha\frac{R}{90} \qquad (1)$$

K therefore varies linearly with α. It was previously pointed out that the capacitance change in pickup 10 is also linear with angular displacement of the vane. The systems are therefore commensurate.

The voltage drops across portions 73 and 75 of resistors 52 and 54 have the value $I(R-K)$, and the voltage drops across portions 74 and 76 of resistors 52 and 54 have the value IK. The potentials of points 56, 57, 58, and 59, with respect to center tap 47 of winding 46, may be defined as follows:

(56) $\quad [E-I(R-K)] = E-IR+IK \quad$ (2)

(57) $\quad -(E-IK) = IK-E \quad$ (3)

(58) $\quad -[E-I(R-K)] = IR-IK-E \quad$ (4)

(59) $\quad (E-IK) = E-IK \quad$ (5)

The potential differences between certain terminals can now be determined: that between terminals 56 and 58 is identified by $V_1$, that between terminals 57 and 59 by $V_2$, and that between terminals 56 and 57 by $V_3$. The voltage is considered positive when the first numbered terminal is positive for a positive condition of slider 61.

$$V_1 = E-IR+IK-IR+IK+E = 2(E-IR+IK) \quad (6)$$

$$V_2 = IK-E-E+IK = 2(IK-E) \quad (7)$$

$$V_3 = E-IR+IK-IK+E = 2E-IR \quad (8)$$

These equations show that $V_1$ and $V_2$ vary with the position of arm 41 but that $V_3$ is constant.

$V_1$ is impressed by conductors 81 and 82 across a voltage divider made up of two equal capacitors having capacitance C: the effect of $C_2$ will be separately considered below. Since the circuit 56, 81, 22, C, 13, C, 24, 82, 58, is symmetrical, point 13 is at the same potential as center tap 47. $V_2$ is impressed by conductors 85 and 86 across a second voltage divider made up of two equal capacitors having capacitance C: the effect of $C_3$ will be separately considered below. The circuit 59, 85, 21, C, 13, C, 23, 86, 57, is also symmetrical, and point 13 remains at the same potential as center tap 47.

Terminal 22 is at potential $E-IR+IK$ and terminal 23 is at potential $IK-E$, both with respect to tap 47, and to the terminals are connected the ends of a voltage divider comprising capacitors $C_2$ and $C_3$. For the point of junction of these two capacitors to be at the same potential as point 13, that is, as center tap 47, the impedances of the capacitors must be proportional to the voltages impressed upon them: that is, $$\frac{X_{C_2}}{X_{C_3}} = \left|\frac{E-IR+IK}{IK-E}\right| \quad (9)$$

The capacitances of the capacitors have the inverse ratio; that is $$\frac{C_2}{C_3} = \left|\frac{IK-E}{E-IR+IK}\right| \quad (10)$$

In the position of the pickup unit shown in Figures 1 and 3, $C_2 = C_3$, and therefore the above condition is not met. A voltage difference accordingly exists between point 13 and tap 47, and a signal is consequently impressed upon the input of amplifier 42. Motor 43 is energized to rotate arm 41, altering the ration between R and K. The rotation is arranged to be in a direction which changes the ratio so as to fulfill the above condition, and when it is fulfilled the signal disappears from the amplifier and the motor stops. In this case when $C_2 = C_3$, the motor rotates in a clockwise direction and stops when $K = R/2$. The operation of the motor has meanwhile accomplished the desired control function through control device 30.

Suppose now the pressure changes, moving vane 27 so that $C_1$ is no longer equal to $C_2$. A new ratio $$\frac{C_1}{C_2}$$

now exists, Equation 10 is no longer met and a new signal is impressed on the amplifier, causing actuation of device 30 and rebalancing of the system by sliders 61 and 62 as just described.

It will be realized that when the ratio $$\frac{C_2}{C_3}$$

exceeds the ratio $$\frac{IK-E}{E-IR+IK}$$

a signal of one phase is impressed upon the input of amplifier 42, while when $$\frac{C_2}{C_3}$$

is less than $$\frac{IK-E}{E-IR+IK}$$

the signal impressed upon the input of the amplifier is of the opposite phase, thus bringing about the reversal in the operation of motor 43 referred to above.

An important advantage of my invention over the conventional type of variable condenser in which the movable vane is of electrically conductive material lies in the fact that the vane need not be accurately parallel with the plates of the condenser. As shown in Figure 2, my vane 27 is perceptibly at an angle with respect to the plates comprising the condenser. If vane 27 were of metal there would be a concentration of the electrostatic field at the upper left hand corner and lower right hand corner of the vane section as shown in that figure, the field would be distorted and the response of the condenser to rotation of arm 26 would be distorted. Moreover, any play in the bearing of shaft 25 would appear as a variation in the signal impressed upon the amplifier, which would result in operation of motor 43 in response to spurious signals. By provision of a dielectric vane instead of the electrically conducting vane, I have avoided these disadvantages and have provided a greatly improved pickup unit which is sensitive, accurate, and free from errors such as those I have recited.

Numerous objects and advantages of my invention have been set forth in the foregoing description together with details of structure and function of the invention, and the novel features thereof are pointed out in the appended claims. The disclosure, however, is illustrative only, and I may make changes in detail, especially in matter of shape, size and arrangement of parts, within the principle of the invention, to the full extent indicated by the broad general meaning of the terms in which the appended claims are expressed.

I claim as my invention:

1. In a device of the class described, a plurality of capacitors having a common terminal and individual terminals, a like plurality of resistors, means connecting said resistors in series to provide an endless resistance member, each terminal of each resistor being common with a terminal of another resistor, means connecting said common terminals of said resistors with said individual terminals of said capacitors, a pair of spaced sliding contacts cooperating with said resistors, said contacts being arranged for movement in such fashion that the resistances between said contacts in opposite directions around said resistance member remain equal, center tapped means energizing said contacts from a source of alternating voltage, electric motor means, means connecting said center tap, and said common terminal of said capacitors, with said motor, condition responsive means, means varying the capacitances of said capacitors, and means associating said condition responsive means with said last named means.

2. In a device of the class described, in combination, a plurality of capacitors having a common electrode and individual electrodes, a like plurality of impedance units, means connecting said units in series to provide an endless impedance member, each terminal of each unit being common with a terminal of one other unit, means connecting said common terminals of said units with said individual electrodes of said capacitors, means supplying a pair of alternating voltages of opposite phase between a common supply terminal and two separate supply terminals, means connecting points on said endless impedance member to said separate supply terminals, a controlled device, and means energizing said device in accordance with the voltage between said common supply terminal and said common electrode of said capacitor.

3. In a device of the class described, in combination, a plurality of capacitors having a common electrode and individual electrodes, a like plurality of impedance units, means connecting said units in series to provide an endless impedance member, each terminal of each unit being common with a terminal of one other unit, means connecting said common terminals of said units with said individual electrodes of said capacitors, means supplying a pair of alternating voltages of opposite phase between a common supply terminal and two separate supply terminals, means applying to spaced points on said endless impedance member the voltage between said separate supply terminals, movable dielectric means differentially varying the capacitances of said capacitors, and motor means varying the points of application of said voltage in accordance with the voltage between said common supply terminal and said common electrode of said capacitor.

4. In a device of the class described, in combination, a plurality of capacitors having a common electrode and individual electrodes, a like plurality of impedance units means connecting said units in series to provide an endless impedance member, each terminal of each unit being common with a terminal of one other unit, means connecting said common terminals of said units with said individual electrodes of said capacitors, means supplying a pair of alternating voltages of opposite phase between a common supply terminal and two separate supply terminals, means applying to spaced points on said endless impedance member the voltage between said separate supply terminals, a motor, means differentially varying the capacitances of said capacitors in accordance with a condition, and means energizing said motor from said source in accordance with the voltage between said common supply terminal and said common electrode of said capacitor.

5. In a device of the class described, in combination: a balanceable network comprising capacitance means, including several capacitors having a common electrode and individual electrodes and a dielectric member differentially varying the capacitances of said capacitors, resistance means, including a like number of resistors and means connecting said resistors in series relation to form an endless resistance member, and means connecting each point common to two of said resistors to the individual electrode of one of said capacitors; a source of electrical energy; means adjustably energizing said resistance means from said source, at two spaced points, to determine the potential of each of said common points with respect to a selected potential, an electric motor; means connecting said motor to adjust said energizing means so as to vary the potentials of said common points, and hence the potentials of said individual electrodes, with respect to said selected potential; means mechanically responsive to a condition; means connecting said last named means in driving relation to said dielectric member, to unbalance said network by varying the capacitances of said capacitors and hence to vary the potential of said common electrode with respect to said selected potential, and means energizing said motor in accordance with the difference between the potential of said common electrode and said selected potential.

WILLIAM K. ERGEN.

REFERENCES CITED

The following references are of record in the file of this patent:

UNITED STATES PATENTS

| Number | Name | Date |
|---|---|---|
| 1,620,020 | Hardy | Mar. 8, 1927 |
| 1,641,946 | Murray | Sept. 6, 1927 |
| 2,147,728 | Wintringham | Feb. 21, 1939 |
| 2,277,027 | West | Mar. 24, 1942 |
| 2,305,878 | Krussman et al. | Dec. 22, 1942 |
| 2,461,832 | Meacham | Feb. 15, 1949 |

FOREIGN PATENTS

| Number | Country | Date |
|---|---|---|
| 750,075 | France | Aug. 3, 1933 |